April 9, 1957  M. W. THOMPSON  2,788,129
HORIZONTAL MULTIPLE FILTER APPARATUS
Filed June 4, 1954

INVENTOR.
M. W. Thompson
BY
ATTORNEY

2,788,129

HORIZONTAL MULTIPLE FILTER APPARATUS

Malcolm W. Thompson, Tulsa, Okla., assignor to Warner Lewis Company, Tulsa, Okla., a corporation of Delaware Application June 4, 1954, Serial No. 434,594

3 Claims. (Cl. 210—323)

This invention relates to improvements in filtering apparatus and more particularly, but not by way if limitation, to a combination filtering and separating device for hydrocarbons and the like.

The present invention contemplates a filtering apparatus having a plurality of filter units designed to afford a substantially greater filtering surface than the usual filtering apparatus in use today. In actual test conditions, it has been found that a thirty inch separator utilizing the present invention has a filter area of approximately eight times that of the standard filters of comparable size presently in use. It is apparent that this greater filtering surface will provide a more efficient separation and filtration of the influent flowing through the filter system. The new filtering device has a novel arrangement of an inlet port at the top of the filter shell which permits the use of a shorter filter shell or tank, thereby effecting a considerable saving in time and cost of manufacture. Furthermore, a novel baffle arrangement is utilized to cooperate with the inlet port and assists in diverting the direct flow of the influent in the tank, thereby protecting the filter units from damage as a result of the velocity and pressure of the influent. The novel design is also such as to afford a saving of time and effort in replacing the filter units when they become dirty or the like. Thus the present invention provides a filter capable of efficient service, ease and speed of use in operation, and economy in construction.

It is therefore an important object of this invention to provide a filtering device having a large filter area relative to the size of the filtering system housing.

It is a further object of this invention to provide a filtering device designed for efficient filtering service, and provide ease and speed of replacement of the filtering elements.

It is a still further object of this invention to provide a filtering device adapted to direct the influent therein in a combined radial and longitudnial path around the filtering elements to afford an efficient filtering service and prevent damage to the elements resulting from the force of the influent entering the system.

It is still another object of this invention to provide a filtering device of durable operation, simple and economical in construction.

Other objects and advantages of the invention will be evident from the following detailed description, read in conjunction with the accompanying drawings, which illustrate my invention.

Figure 1:
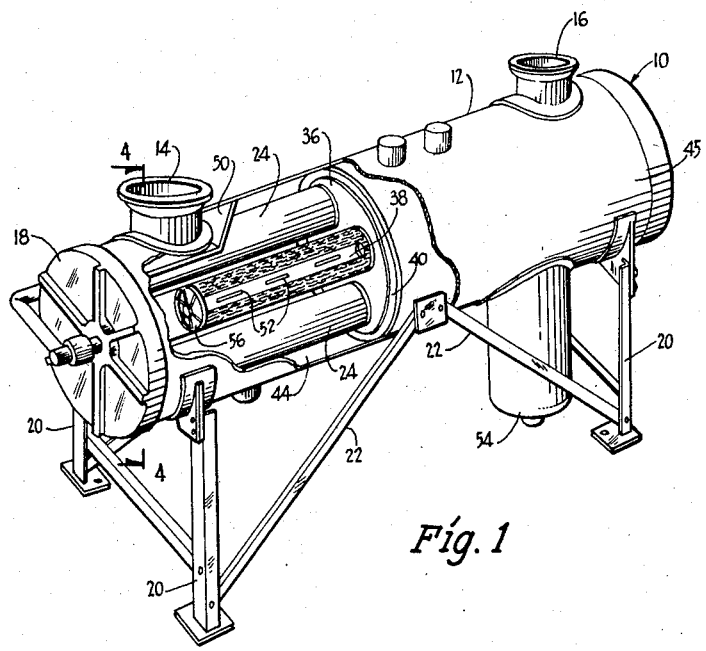
Figure 1 is a perspective view of a filtering device embodying the invention with a cut-away portion showing the novel filter units.

Referring to the drawings in detail, reference character 10 generally indicates a combination separator and filter apparatus comprising a substantially circular tank or shell 12 preferably horizontally disposed as shown and having an inlet port 14 and an outlet port 16 disposed at opposite ends of the top thereof. The separator 10 is further provided with an end plate 18 attached thereto by any suitable means (not shown) to allow ease of removal for permitting access to the interior of the body 12. The unit 10 is supported by any suitable legs 20 and brace members 22 secured to the tank 12 in any well known manner, such as clearly shown in Fig. 1. A plurality of filter units 24, preferably of circular configuration, are disposed within the body 12 and are secured therein in a manner as will be hereinafter set forth. Each filter unit 24 consists of end grids 26 (Fig. 2) and a filtering material 28, such as excelsior, metallic wools, plastic shavings or the like, contained within a hard ware cloth tube (not shown).

The filter units 24 are pre-formed in the following manner: A pipe (not shown) of substantially the same diameter and length as the filter units 24 is cut in half longitudinally. Each half section is provided with outwardly protruding dog ears for aligning the two sections, thereby forming a die of the desired size. The rear end of the die (not shown) is provided with circumferentially disposed, inwardly directed flanges for maintaining the filter pack as will now be described. In the assembly process, one of the grids 26 is disposed within the assembled half sections of pipe (not shown) and is supported in the lower end thereof by the aforesaid flanges. Next, a flat disc 25 of hard ware cloth of substantially the same diameter as the inside of the pipe die is dropped into the pipe die to lie on top of the grid 26. Following this, a pre-formed tube 27 of hard ware cloth, made substantially the same diameter and length as the inside of the die and stapled together to form a cylinder, is disposed within the die to be supported by the flat disc and grid previously placed therein. The filter material 28 is then placed inside the hard ware cloth tube and compressed to the density required for this particular filter. After the compression of the excelsior, or other material, a second disc 29 of hard ware cloth similar to the one contained within the lower portion of the die is laid on top of the excelsior to receive the remaining grid 26 at the opposite end. Quadrantly spaced bailing wires 31 are then disposed longitudinally through the filter unit and secured at each end thereof in any suitable manner. Thus, a pre-formed bundle is assembled that may be lifted out of the die as a unit.

Figure 3:
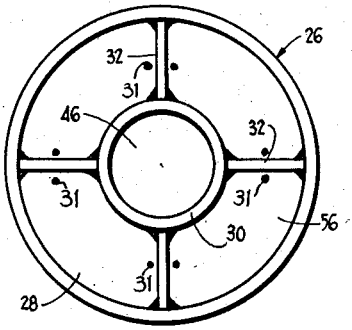
Figure 3 is an end view of a filter unit of the present invention.

It will be noted (Fig. 3) that the grids 26 are provided with a central aperture 30 and radially extending arms 32. Upon removal from the die, the pre-formed bundle is placed in a suitable lathe and the filter bundle is moved over any suitable tool, such as a pipe of the proper diameter having one end knife-edged, to cut out a central aperture 34 of substantially the same diameter as the aperture 30. This central aperture 34 is necessary to the process of anchoring the filters within the shell 12, as will hereinafter be described. After the boring operation, a flat circular plug 46 is secured within the aperture 30 of one of the grids 26 for closing the aperture.

A tube receiving plate 36 may be bolted or welded directly to the inner periphery of the shell 12 or may be similarly secured to an inner peripheral retaining ring or flange 40 which is welded or the like to the shell 12.

The plate 36 thus secured divides the interior of the horizontal shell 12 into two chambers 44 and 45 for keeping the filtered emulsion from mingling with the unfiltered emulsion as will be hereinafter set forth. The plate 36 is provided with a plurality of apertures for receiving slotted pipes 38, welded or brazed thereto in any well known manner. The slotted tubes or cylinders 38 are of substantially the same length and diameter as the aperture 34 of the filter units 24. Therefore, it is possible to easily slide the filter units 24 longitudinally along the tubes 38 into a position adjacent the plate 36 as clearly shown in Fig. 1.

Figure 2:
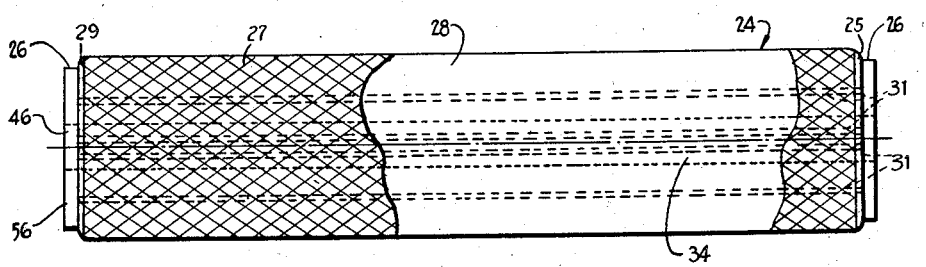
Figure 2 is a side elevational view of a filter unit of the present invention with certain portions shown in dashed lines and a part of the outside covering broken away for purposes of illustration.
Figure 4:
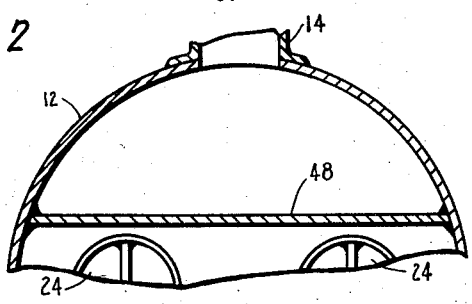
Figure 4 is a sectional view taken along line 4—4 of Fig. 1.

A baffle 48 extends in horizontal disposition beneath the upper portion of the shell 12 directly beneath the inlet 14, and across the upper portion of the forward end of the shell 12 as clearly shown in Figs. 1 and 4. The baffle 48 is provided with a rearward extension 50 (Fig. 1) angularly arranged to close off that portion of the interior of the shell adjacent the inlet 14 so that the influent mixture entering the inlet 14 is directed to the front end of the baffle 48 and tank 12 (not shown). The front end of the baffle extends substantially horizontally to a position between the left end of the filter units 24 (Fig. 1) and the end plate 18. The importance of the positioning of the baffle 48 will be set forth in the details of operation to follow.

Operation

In operation, the influent to be filtered is directed into the filtering system through inlet port 14. Normally the influent is under considerable pressure, thereby having a force and velocity that may seriously damage the filter elements 24 if it were allowed to impinge directly against them. It will be apparent that the baffle 48, positioned directly below the inlet 14, receives the full impact of the inrushing influent. Upon contact with the baffle 48, the influent is directed toward the left (Fig. 1) or forward end of the shell 12 to be dispersed in the proximity of the end plate 18 in the filtering chamber 44. The plug 46 of the filter units 24 precludes the entrance of the emulsion into the slotted tube 38 at that point. Therefore, the emulsion follows a longitudinal path in the tank, and enters the units 24 at the forward end 56, and is also directed along the sides of the filter units 24 where it is directed radially or transversely through the filter units 24, thereby providing dual directional flow of the influent both longitudinally and radially. It will be apparent that the filtering surface will include the entire outer periphery of the filters as well as the portions between the arms 32, thus increasing the filter area many fold.

As the emulsion flows through the filter material 28, impurities are left therein. The fluid, substantially free from foreign content, then enters the pipe 38 through the slots 52 to be directed longitudinally therethrough into the chamber 45. It will be noted that the slots 52 do not extend to the ends of the tubes 38. The compressed condition of the normal characteristics of the filter material permits an expansion thereof when wetted. The hardware cloth tube binds the material in such a manner as to prevent any outwardly expansion, thereby forcing a radially inward pressure against the tube 38. The pressure of the excelsior or the like against the tube will form a natural seal at the ends of the tube 38, thereby preventing any possible by-passing of the emulsion and assuring an efficient filtering thereof.

The heavier contents of the filtered emulsion within the chamber 45 are allowed to settle to the bottom of the shell 12 where they may be removed in the usual manner by means of a water leg 54. The lighter constituents of the filtered influent are discharged from chamber 45 in any well known manner through the outlet 16.

During the normal use of the filtering system 10, it is recognized that the units 24 will become less efficient as they become clogged with foreign matter filtered from emulsions flowing therethrough. It is a simple and expedient matter to remove the end plate 18, slide a filter unit 24 off a tube 38 and replace with new filter units as may be required. The time required to change filters is such that the shut down of operation of the system is at a minimum, thereby affording a considerable saving in cost as well as time. It will also be apparent that the removal of the end plate 18 allows complete accessibility to the interior of the shell for any repairing, cleaning or other work necessary to the efficient operation of the apparatus.

From the foregoing, it will be apparent that the present invention provides a novel separator-filter device affording a substantially larger filtering area to permit a thorough and efficient filtration of emulsion traveling therethrough. The construction of the apparatus is such as to facilitate the ease of cleaning or replacing filters, thereby affording a considerable saving in time and cost of operation. The design also permits the use of a short tank utilizing the same large filtering surface normally found in larger or longer tanks, thus substantially reducing the cost of manufacture, as well as providing an efficient separator-filter effecting a saving in time and labor and operation.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a separator for fluids comprising a cylindrical vessel, an inlet in the vessel for receiving an influent mixture therein, a plurality of circumferentially spaced tubes anchored in the vessel, a plurality of longitudinally arranged filter cartridges adapted to be carried by the tubes, a baffle plate carried by the vessel and disposed above the filter cartridges directly below the inlet and beyond the free end of the cartridges, said baffle plate directing the influent mixture from the inlet toward one end of the vessel to prevent direct impact of the inlet pressure fluid downwardly against the filter cartridges, said influent directed from the baffle plate into contact with the filter elements for movement in both a longitudinal and radial direction therethrough, said supporting tubes provided with slotted apertures for permitting discharge of the flowing influent therethrough.

2. In a separator for fluids comprising a cylindrical vessel, an inlet in the vessel for receiving an influent mixture therein, a plurality of circumferentially spaced tubes anchored in the vessel, a plurality of longitudinally arranged filter cartridges adapted to be carried by the tubes, a baffle plate carried by the vessel and disposed above the filter cartridges directly below the inlet and beyond the free end of the cartridges, said baffle plate directing the influent mixture from the inlet toward one end of the vessel to prevent direct impact of the inlet pressure fluid downwardly against the filter cartridges, said influent directed from the baffle plate into contact with the filter elements for movement in both a longitudinal and radial direction therethrough, said supporting tubes provided with a plurality of slotted apertures permitting discharge of the filtered influent from the cartridges.

3. In a combined filter and separating apparatus for fluids comprising a cylindrical tank having a baffled portion providing a tube compartment therefor, an inlet in one end of the tank for discharge of an influent mixture therethrough, a plurality of circumferentially spaced tubes anchored to the baffle and extending longitudinally in the tank toward the inlet, a pre-formed filter cartridge carried by each of the tubes, means disposed in the tank for diverting direct downward impact of the inlet pressure fluid from against the filter cartridges, after which the influent is moved into contact with the elements in both a longitudinal and radial direction for flow therethrough, each of said filter cartridges comprising a cylindrical pre-shaped bundle of compressed excelsior having means for maintaining it in pre-formed condition, means in the pre-formed bundles providing for support of the cartridges on the supporting tube members, said supporting tubes provided with means permitting discharge of the filtered influent from the cartridge.

References Cited in the file of this patent

UNITED STATES PATENTS

| | | |
|---|---|---|
| 619,569 | Hewel | Feb. 14, 1889 |
| 885,047 | Hendryx | Apr. 21, 1908 |
| 1,930,209 | Milkey | Oct. 10, 1933 |
| 2,097,828 | Baldwin | Nov. 2, 1937 |
| 2,348,925 | Reichhelm | May 16, 1944 |
| 2,401,039 | Bauer | May 28, 1946 |
| 2,405,838 | Lawson et al. | Aug. 13, 1946 |
| 2,412,841 | Spangler | Dec. 17, 1946 |
| 2,555,607 | Robinson | June 5, 1951 |
| 2,649,964 | Taylor | Aug. 25, 1953 |
| 2,667,272 | Tursky | Jan. 26, 1954 |
| 2,672,984 | Russell | Mar. 23, 1954 |
| 2,707,050 | Macro | Apr. 26, 1955 |